March 25, 1958 E. E. AFFELD 2,827,643
ANT REPELLENT BEE HIVE STAND
Filed Nov. 6, 1956
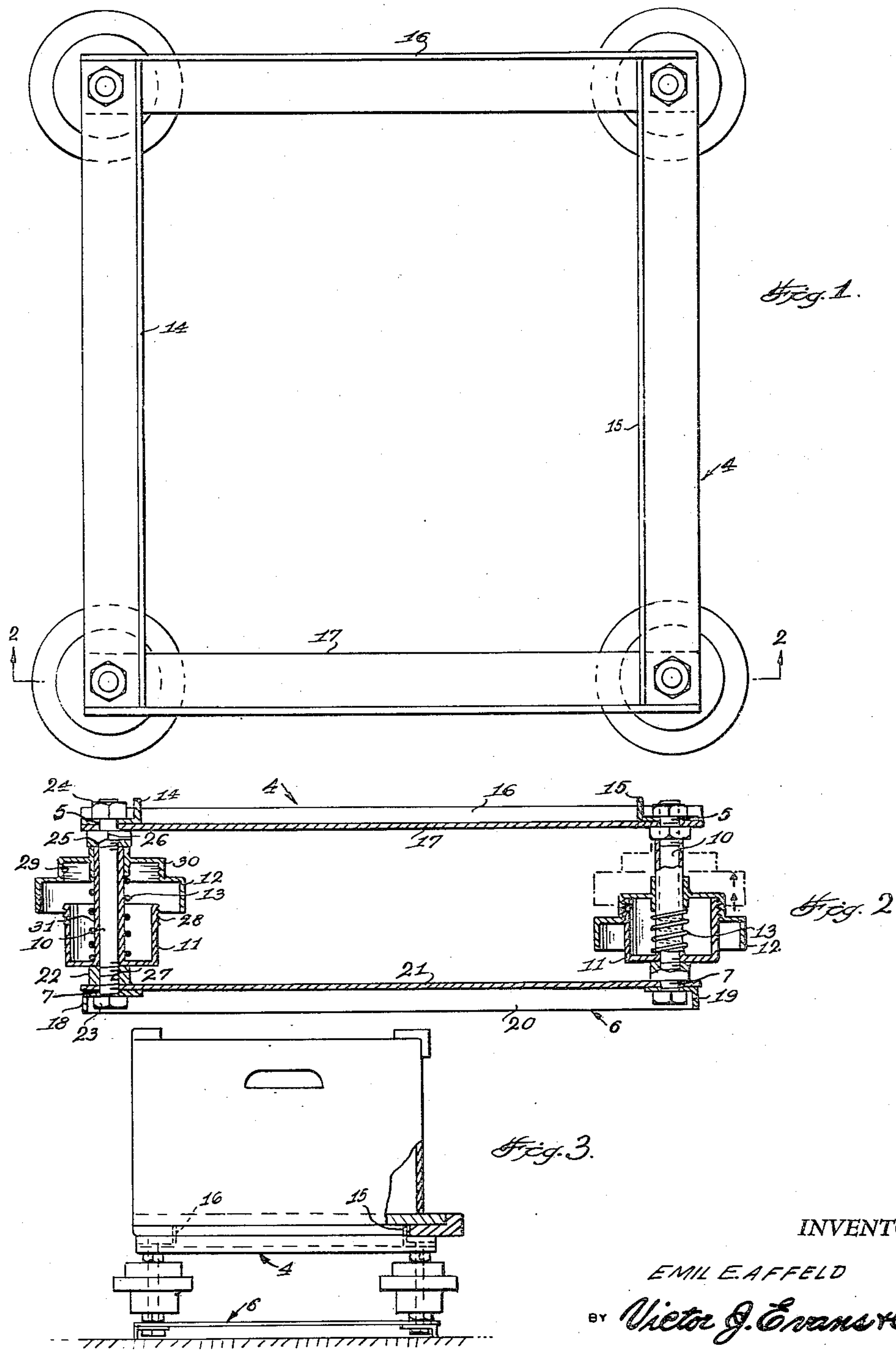
INVENTOR.
EMIL E. AFFELD
BY Victor J. Evans & Co.
ATTORNEYS United States Patent Office 2,827,643

Patented Mar. 25, 1958

2,827,643

ANT REPELLENT BEE HIVE STAND

Emil E. Affeld, Moses Lake, Wash.

Application November 6, 1956, Serial No. 620,751

3 Claims. (Cl. 6—6)

This invention relates to bee culture, and in particular a stand for a bee hive in which it is necessary for ants to travel through oil in a reservoir in order to enter the bee hive.

The purpose of this invention is to provide supporting means for a bee hive wherein ants and other crawling insects are require to travel through fluid in order to climb upwardly into the hive.

In some parts of the United States and particularly in Florida, Texas and California ants enter bee hives, driving out the bees and, consequently, it is necessary to provide means for preventing ants entering the bee hives. With this thought in mind this invention contemplates spaced frames having posts extended upwardly from the corners thereof with superimposed frames mounted on the posts and in which the posts are provided with cup-shaped reservoirs and covers with outwardly extended flanges projecting around the peripheral surfaces of the reservoirs, the covers being resiliently held upwardly from the reservoirs by springs around the posts.

The object of this invention is, therefore, to provide means for constructing supporting stands for bee hives wherein cup-like reservoirs are provided around supporting elements so that with the reservoirs filled with oil it is impossible for ants and other crawling insects to travel upwardly into the bee hive without passing through the oil.

Another object of the invention is to provide ant repellent supporting elements for bee hives in which the supporting elements are adapted to be used on conventional bee hives without changing the hives.

A further object of the invention is to provide ant repellent supporting elements for bee hives in which the supporting devices are of simple and economical construction.

With these and other objects and advantages in view the invention embodies spaced rectangular-shaped angle iron frames with posts mounted in openings at the corners of the frames and with the posts surrounded by springs, cup-shaped reservoirs and covers.

Other features and advantages of the invention will appear from the following description taken in connection with the drawing, wherein:

Figure 1 is a plan view of the improved bee hive stand.

Figure 2 is a cross section through the stand taken on line 2—2 of Fig. 1.

Figure 3 is an end elevational view on a reduced scale with part of the lower corner of the bee hive on the stand broken away showing a bee hive positioned on the ant repellent stand.

Referring now to the drawing wherein like reference characters denote corresponding parts the improved ant repellent stand for bee hives of this invention includes bolts 10 forming vertically disposed posts having reservoirs 11 on lower parts thereof with covers 12 also mounted on the posts and extended over the reservoirs and having springs 13 for resiliently holding the covers in upwardly disposed positions, an upper frame 4 mounted on the posts and having longitudinally disposed bars 14 and 15 and transversely disposed bars 16 and 17, the bars having openings 5 spaced inwardly from the ends for receiving the posts, and a lower frame 6 having longitudinally disposed bars 18 and 19, and transversely disposed bars 20 and 21 connecting the ends of the bars 18 and 19, the bars 18, 19, 20 and 21 also having openings 7 spaced inwardly from the ends and through which bolts or posts extend.

As illustrated in Fig. 2 the bolts 10 forming the posts are provided with nuts 22 and 23 between which the bars of the lower frame 6 are positioned and also nuts 24 and 25 between which bars of the upper frame 4 are positioned.

The ends of the posts 10 are threaded to receive the nuts, as shown at the points 26 and 27 and the outer surface of the reservoir 11 is provided with threads 28 which coact with threads 29 in the upper portion 30 of the cover to retain the covers in position upon the reservoirs for transportation.

With the parts designed and assembled as illustrated and described a stand is positioned upon the ground or a suitable foundation and with the bee hive, or a plurality of bee hives positioned upon the upper frame 4 formed with the angle bars 14, 15, 16, and 17 the bee hive is supported in spaced relation to the ground and ants attempting to enter the bee hive must crawl upwardly over the outer surfaces of the reservoirs 11 and pass inwardly to the sleeves 31 of the reservoirs 11 which extend upwardly to the lower surfaces of the nuts 25 and with the reservoirs filled with oil or other insect repellent material the insects, and particularly ants, will not travel across or through the oil to reach the sleeve 31 on the posts. By this means bee hives positioned upon the stand are definitely protected from the ants and the like.

It will be understood that modifications, within the scope of the appended claims, may be made in the design and arrangement of the parts without departing from the spirit of the invention.

What is claimed is:

1. A bee hive stand comprising a lower frame, a plurality of bolts extended upwardly from the lower frame, a bee hive supporting upper frame mounted on said bolts, cup-shaped reservoirs having a sleeve integral therewith positioned on the bolts, covers slidably mounted on the sleeves on the posts and extended outwardly over the reservoirs, and resilient means mounted on the sleeves and engaging said reservoirs and said covers for urging the covers in upwardly disposed positions.

2. In a bee hive stand, the combination which comprises a lower frame, vertically disposed bolts, mounted in the lower frame and extended upwardly therefrom, a bee hive supporting upper frame mounted on upper ends of the bolts, cup-shaped reservoirs having a sleeve integral therewith extended around the bolts with the reservoirs spaced from the posts, inverted cup-shaped covers slidably mounted on the sleeves on the bolts and positioned with peripheral portions thereof spaced outwardly from the reservoirs, and springs on the sleeves engaging the reservoirs and covers for resiliently holding the covers in upwardly disposed positions.

3. In a bee hive stand, the combination which comprises a lower frame including longitudinally and transversely disposed angle bars having openings spaced inwardly from ends thereof, bolts extended through the openings of the angle bars and secured in position therein with nuts threaded on the bolts, an upper frame also including longitudinally and transversely disposed angle bars, the angle bars of the upper frame also having openings spaced inwardly from the ends thereof and said openings being positioned over upper ends of the bolts, nuts threaded on upper ends of the bolts for clamping the angle bars of the upper frame in position on the bolts, cup-shaped reservoirs having a sleeve integral therewith extended around the bolts, with the reservoirs being spaced outwardly from the bolts, covers having peripheral portions thereof spaced outwardly from the upper edges of the reservoirs slidably mounted on the sleeves on the bolts, and springs extended around the sleeves on the bolts and engaging the reservoirs and the covers for retaining the covers in upwardly disposed positions.

References Cited in the file of this patent

UNITED STATES PATENTS

| | | |
|---|---|---|
| 206,714 | Fife | Aug. 6, 1878 |
| 1,776,314 | Fenno | Sept. 23, 1930 |